though less preferred, may be mentioned polycondensation products of dicarboxylic acids and diamines.

United States Patent Office
3,692,714
Patented Sept. 19, 1972

3,692,714
AQUEOUS DISPERSION OF A COMPATIBILIZED REACTION PRODUCT FORMED BY HEAT REACTING A FATTY ACID ESTER ADDUCT WITH A POLYAMIDE
Jacobus M. Keyman, Kapel-Avezaath, Netherlands, and Arnold E. Maschke, Cologne, Germany, assignors to Mobil Oil Corporation, New York, N.Y.
No Drawing. Filed Feb. 2, 1970, Ser. No. 8,052
Claims priority, application Netherlands, Feb. 28, 1969, 6903222
Int. Cl. C08g 45/12
U.S. Cl. 260—18 PN
11 Claims

ABSTRACT OF THE DISCLOSURE

Drying oil fatty acid ester, and especially an epoxy resin ester, is adducted with an unsaturated polycarboxylic acid such as maleic anhydride to provide a resin which is cooked with a resin having amine and acid functionality such as a polyamide having terminal amino and carboxylic acid groups, made by the self-condensation of an amino acid to provide a compatibilized reaction product which can be dispersed in water with the aid of a base and deposited at the anode by a unidirectional current.

---

The present invention relates to the preparation and use of resinous reaction products which can be used for coating purposes. With these products coatings are obtained having good resistance to alkalis and detergents, which coatings are suitable as primers and finishes on various materials, particularly metals. With the materials of this invention, coatings can be applied in any usual manner, such as by dipping, spraying, brushing, or electrocoating. However, the products are particularly suitable for applying coatings from aqueous systems by electrocoating, wherein they show an especially good ability to deposit layers of uniform thickness, on irregular surfaces. Furthermore, they can be applied with the use of relatively high voltages, i.e. in a fast and intensive way. The coatings obtained with the products of this invention also show superior corrosion resistance, even without the incorporation of anti-rust pigments, e.g. lead compounds, which are often used in order to obtain good corrosion resistance.

In accordance with the present invention a film-forming compatible resinous product is prepared by reacting with a resin having terminal amino and carboxylic acid groups, such as a polyamide, the esterification reaction product of an hydroxyl-functional organic compound with ethylenically unsaturated fatty acids from a drying oil, and a polycarboxylic acid or anhydride thereof.

In accordance with the present invention one starts from an esterification product of a polyhydric alcohol with fatty acids from a drying oil, semi-drying oils also being encompassed by the term drying oils. Examples of such oils are linseed oil, soya oil, safflower oil, perilla oil, tung oil, dehydrated castor oil and the like. Tall oil fatty acids are preferred and wil be used to illustrate the invention.

The ester is prepared from fatty acid from one or more of the above oils. The ester is a polyester with the selected polyhydric alcohol and it will preferably contain a small proportion of free hydroxyl groups. The polyester used is preferably based on a polyhydric alcohol which is itself a macromolecular material, e.g. is itself resinous, and is most preferably derived from an epoxy compound. However, polyesters of simple polyhydric alcohols may also be used, such as butanediol, trimethylolethane, trimethylolpropane, trimethylolhexane or pentaerythritol. Also, polyesters of resinous polyols, can be used such as polymers of unsaturated aliphatic alcohols, e.g. allyl or methallyl alcohol, or copolymers of such unsaturated alcohols with styrene or other ethylenically unsaturated monomers. One may aso use esters of the fatty acids from drying oils with alkyd resins containing an excess of free hydroxyl groups, or copolymers of such alkyd resins with the mentioned unsaturated alcohols.

If one forms the polyesters with epoxy compounds, one can use such compounds as mono-, di-, or polyepoxides, but it is particularly preferred to use diglycidyl ethers of compounds having 2 hydroxyl groups, and more especially diglycidyl ethers of bisphenols, since outstanding resins are obtained therewith. Particularly suitable are diglycidyl ethers of Bisphenol A, 2,2,'-bis(p-hydroxyphenyl) propane having an average molecular weight of 1000, a melting point of 64°–76° C., an epoxy content of 0.20 equivalent per 100 grams and a hydroxy content of 0.32 equivalent per 100 grams.

The term "bisphenol" identifies a pair of phenolic groups joined through an intervening divalent aliphatic radical, preferably an alkylene group.

The extent to which the unsaturated fatty acid is used to esterify the polyhydric alcohol is of significance and at least about 75% of the available hydroxy functionality should be consumed by esterification to avoid gelling the product upon subsequent reaction. While all the hydroxy functionality can be consumed, it is preferred to leave at least 5% of the initial hydroxy functionality unreacted.

The esterification product which preferably contains free hydroxyl groups is then reacted with an unsaturated polycarboxylic acid or anhydride thereof. As examples may be mentioned maleic acid and its anhydride, fumaric acid, itaconic acid and its anhydride, etc. Unsaturated dicarboxylic acids which form anhydrides or the corresponding anhydride are preferred.

By the reaction between the ester which contains hydroxyl groups and the acid or acid anhydride, an addition product is formed. This can take place in two ways, i.e. by a reaction of free hydroxyl groups with the anhydride group, with free carboxylic groups, or with carboxylic groups formed from the anhydride, or by an addition reaction involving the double bonds of the fatty acid from the drying oil, and/or the unsaturated dicarboxylic acid or anhydride, e.g. a reaction of the Diels-Alder type. An addition reaction occurs with certainty, and for the sake of ease, the reaction product is therefore sometimes called an addition product hereinafter.

In general, the unsaturated polycarboxylic acid or anhydride thereof is used in such an amount that it constitutes 3–25% by weight of the addition product, and preferably 6–15% by weight. Maleic anhydride which is a readily available commercial product is preferred.

As the resin containing terminal amino and carboxylic acid functionality, linear polyamides are typical. Polyamides of any of the known species can be used, e.g. polycondensation products of dicarboxylic acids and diamines, such as the known polycondensation product of adipic acid and hexamethylene diamine. Especially suitable are the polyamides which are obtained by autopolymerization of ω-amino-carboxylic acids, in particular those of the formula $H_2N-(CH_2)_n-COOH$, wherein $n$ is a number having a value of at least 5. Particularly preferred are autocondensation productions of 11-aminoundecanoic acid. This amino acid can be heated alone or in solution, for example, in xylenol, at a temperature of about 215° C. to provide a high melting polyamide. An example of such a polyamide is a product having a melting point of about 185° C., which is also relatively insoluble, but does dissolve to a substantial degree in phenols and formic acid. As further suitable products autopolymerization products of ω-aminocarboxylic acids of the above formula can be mentioned, wherein $n$ has a value of 6 or 8.

During the reaction of the unsaturated polycarboxylic acid (or anhydride)-modified esterification product with the polyamide, residual functional groups in both products react to form a macromolecular film-forming product. The reaction can simply be carried out by heating both reactants at a moderately elevated temperature, usually 100°–300° C., and preferably 200°–250° C. One can easily determine whether the reaction is completed, by drawing a film on a glass plate with a 75% 2-ethoxyethanol solution of the mixture. The reaction is completed, if after evaporation of the solvent, the film is free from seeds and clear which denotes the production of a compatibilized reaction product.

The polyamide can be used in amounts of 1–25%, based on the total weight of modified esterification product and polyamide; more preferably the polyamide is used in an amount of 5–15% by weight, and particularly of around 10% by weight, all calculated on the same basis.

The resinous product so-obtained can be dispersed in water with the aid of a base, such as an amine, and so an aqueous system is obtained which can be anodically electrodeposited. Coatings deposited in this way show an excellent alkali and detergent resistance. However, if desired, other resins may also be dispersed in the system, although this is not necessary.

It should be remarked that with usual electrocoating compositions, corrosion resistance or detergent resistance can only be obtained either by incorporating into the coating mixture special pigments which inhibit corrosion, such as lead silico-chromate, strontium chromate or barium chromate, or by simultaneously depositing an etherified aminoplast resin, and curing this thereafter. Due to the unusual reaction product provided by this invention, it is not necessary to apply such standard measures, because the resin deposited with the aid of the compositions of the invention provides an excellent corrosion and detergent resistance coating without any of these expedients. However, it is of course possible to apply any one or both of these expedients, in which case they do no harm. This also means that with the products of the invention one may obtain either clear or pigmented films, as desired, wherein for the pigments a broad choice is available between the numerous known pigments which can be incorporated in aqueous coating systems, without it being obligatory to use the abovementioned pigments.

The dispersion of the composition in water is easily effected by agitating and with the aid of a base which forms a salt with the carboxyl groups in the reaction product. The reaction product only needs to possess a sufficient degree of acidity to obtain a stable aqueous dispersion, and it is not necessary that a true solution in water is formed.

As the base inorganic bases can be used, e.g. sodium or potassium hydroxide, but volatile nitrogeneous bases are preferred, particularly the organic water-soluble amines. Any primary, secondary or tertiary amine can be used, comprising the hydroxyl amines. As examples of preferred amines, di- and triethyl amine, and di- and tri-ethanol amine can be mentioned.

The amount of base can vary considerably, provided a stable dispersion is formed. The final pH of the bath can be about 6 to about 10.5, a value of 7.5–9.5 being preferred.

The concentration of the resin in the electrocoating bath can vary generally from 1 to 25% by weight, but is preferably 5–12% by weight. Of course, for other coating methods different concentrations are preferred. Thus, for a dipping process a concentration of 25–30% by weight is preferably used.

As has been mentioned already, the application of the coating can be carried out according to any usual method. However, because the present condensation product has been especially developed for electrocoating, this method is described here in somewhat more detail.

In the electrocoating operation a conventional voltage and current are used, and also the depleted bath is replenished in the usual way.

When the acidic resin is deposed, the base (usually amine) is released, and furthermore, the bath often contains also a water-miscible solvent, which is also known per se, and serves to facilitate a good dispersion of the resin in water. As such solvent, 2-ethoxyethanol is particularly suitable. Any solvent or amine deposited with the resin is largely removed during the subsequent baking of the deposited film. For this heat treatment temperatures are used of from about 120° C. to about 260° C. for periods of time which can vary from about 30 minutes at temperatures in the lower part of the above range to 30 seconds at temperatures in the upper part of said range.

The invention is illustrated by the following examples.

EXAMPLE I

A resin was prepared from the 4 ingredients mentioned hereinbelow, the stated percentages being based on the total weight of these 4 ingredients:

(1) 57.54% tall oil fatty acids.
(2) 26.09% diglycidyl ether of bisphenol A having an average molecular weight of 1000, a melting point of 64–76° C., an epoxy value of 0.20 equivalent per 100 g. and an hydroxyl value of 0.32 equivalent per 100 g.
(3) 7.27% maleic anhydride.
(4) 9.10% linear polyamide with terminal amino and carboxyl groups having a melting point of about 185° C., obtained by autocondensation of 11-aminoundecanoic acid.

The tall oil fatty acids were heated to 150° C. under nitrogen sparge and stirring and at this temperature the diglycidyl ether of bisphenol A was added, together with 3% xylene. The temperature was increased to 230° C. in the course of 1 hour and held at this value until an acid number of 45 was reached (after about 2 and ½ hours). To maintain the reflux during this treatment, an additional 3% xylene can be added. When an acid number of 45 was reached, the temperature was increased to 240° C. and the solvent was removed with the use of decreased pressure (an absolute pressure of 60 mm. Hg). The temperature was then decreased to 150° C. and the maleic anhydride was added. After 1 hour the temperature was increased again to 230° C., and then held at this value for about 10 minutes until a Gardner-Holdt viscosity of 10–13 sec. was obtained, measured with a non-volatile solids content of 70% in mineral spirits. Thereafter the polyamide was added and the temperature was maintained at 230° C. for about 1 and ½ hours until a seedfree film was formed on a glass plate in the test described hereinbefore; this provided a Gardner-Holdt viscosity of the mixture of 60 sec., measured with a 75% non-volatile solids content in 2-ethoxyethanol. The temperature was then decreased to 215° C. and held at this value until the Gardner-Holdt viscosity, measured in the same way, was 120 sec. Subsequently, the resin was cooled to 180° C., and formulated with 2-ethoxyethanol to form a solution containing 75% non-volatile resin solids.

The so-obtained resin solution was combined with diethylamine and water in a weight ratio of 86:4:60 to provide a concentrate suitable for storage. Before use, this concentrate was diluted with water in the ratio 1:7 and diethylamine was added to pH 9.0. From this bath, clear homogeneous films were electrodeposited at voltages up to 120 v., the deposited mixture being excellently deposited on irregular surfaces to provide a uniform coating.

In another experiment with this same resin a concentrate with 60% resin was prepared. With this concentrate a coating can be applied by spraying to metal. By diluting the concentrate to a content of 28–30%, a dipping bath is obtained with which also coatings of the same good quality can be applied.

EXAMPLE II

A black electrocoat primer was prepared from the resin solution of 75% resin content prepared according to Example I, by grinding 29.9 parts by weight of this solution, 1.75 parts of diethylamine, 28.80 parts by weight of water, 4.90 parts by weight of carbon black and 14.65 parts by weight of baryte to form a pigmented paste. 16.70 parts by weight of this paste were then mixed with an additional 44.65 parts by weight of resin solution, 1.75 parts by weight of diethylamine and 36.90 parts by weight of water to form a concentrate. By diluting this concentrate with a triple weight amount of water a bath suitable for electrocoating was obtained having a pH of 8.6. This bath was tested at various voltages. These tests were carired out by dipping a panel of bonderized steel having a width of 10.16 cm. into the bath to a depth of 7.62 cm. and carrying out the electrocoating for 1 minute. After rinsing and heat-treating, the film thickness was measured. Tests were repeated to determine the maximum voltages at which the present coating composition could be used. The results were as follows:

| Voltage (v.): | Film thickness, microns |
|---|---|
| 60 | 5–6 |
| 120 | 9–10 |
| 140 | 11–13 |
| 160 | 14 |
| 180 | 15–16 |
| 200 | 17–18 |
| 220, no continuous film. | |

In the coating operation, the penetration power on irregular surfaces were excellent and the deposited films exhibited excellent corrosion resistance and detergent resistance in that the deposited films withstood spraying with salt water for 240 hours and a 500 hours water soak with no detriment to the films. The films also exhibited excellent adhesion and impact resistance.

EXAMPLE III

Some comparative experiments were carried out using the same materials as in Example I, but resins of varying compositions were prepared. The reaction between the polyamide and the adduct was carried out as described in Example I.

(a) A resin was prepared from 64.60% by weight of tall oil fatty acids, 28.85% by weight of epoxy resin and 6.55% by weight of maleic anhydride. This resin is not reacted with polyamide, but is brought to a solids content of 75% with ethoxyethanol, and then after further dilution used in the manner described in Example II for electrodepositing a coating on bonderized steel.

(b) A resin was prepared as in part (a), and this was reacted subsequently with 20% by weight of polyamide. The resin so-obtained was also adjusted with ethoxyethanol to a solids content of 75%, and after further dilution as in Example II, it was used for coating panels of bonderized steel.

(c) The same ingredients as in part (b) were used again and in the same proportions, but this time, the reaction product of the fatty acid and the epoxy resin was first reacted with the polyamide at 230° C. After the mixture had been cooled to 160° C. the acid number was 29.3 and a 70 percent solution in mineral spirits was not clear. Thereafter the maleic anhydride was added, and the temperature was raised to 240° C., and kept at this value for about 1 and ½ hours. A carbonization process occurred herein, presumably of incompletely reacted small polyamide particles. For this reason the resin could not be considered useful.

In the coating tests with the resins of parts (a) and (b) various voltages and currents were used. In this connection it should be noted that the product of part (a) cannot be used at voltages higher than about 80 v., since, at higher voltages, no complete film is obtained and the coating is only deposited in localized areas. In contrast, the resin of part (b) can be utilized at higher voltages. The purpose of the tests carried out here was more particularly to measure the electrical resistance of the applied layer per micron of layer thickness. The results were as follows:

| Resin | (a); pH=9.2 | | (b); pH=9.5 | | |
|---|---|---|---|---|---|
| Voltage (v.) | 50 | 80 | 80 | 120 | 150 |
| Current (ma.) | 910 | 990 | 70 | 82 | 104 |
| Thickness of deposited film, (microns) | >40 | >40 | 7.5 | 11 | 14.5 |
| Resistance (ohms per micron of layer thickness) | 1.34 | 1.97 | 150 | 131 | 98 |

EXAMPLE IV

Part (b) of Example III was repeated using "Rilsan" nylon 11 powder in place of the polyamide used therein. The resin so-obtained was tested in the same way as in Example III. With a voltage of 80 v. and a current of 56 ma., a film was obtained with a layer thickness of 7.5 microns and a resistance of 187 ohms per micron of layer thickness. At a voltage of 120 v. and a current of 42 ma., a film was obtained having a thickness of 9 microns and a resistance of 313 ohms per micron of layer thickness. The pH of the dispersion was 9.0.

EXAMPLE V

In this example experiments were carried out using a higher maleic anhydride content so that the resin which had been reacted with the polyamide had a higher acid number. In this way the reaction with the polyamide occurred faster as evidenced by faster dissolution of the polyamide to form a compatible film as has been described.

(a) A resin was prepared from 63.22% by weight of tall oil fatty acids, 28.28% by weight of epoxy resin (the same as in Example I), and 8.40% by weight of maleic anhydride. The acid number of this resin was 73.0.

(b) The resin prepared according to part (a) was reacted with 10% by weight of polyamide, i.e. the same colorless Rilsan Nylon 11 powder as in Example IV. The acid number of the reaction product was 61.3.

(c) The resin of part (a) was again reacted with 10% by weight of the Rilsan Nylon 11 powder, but this time with addition of 2% by weight of lithium ricinoleate, which is known as a transesterification catalyst, in order to examine whether the dissolving rate of the polyamide was increased hereby. By visual observation a faster dissolution could not be found. The acid number of the reaction product was 60.2.

(d) The resin of part (a) was reacted with 10% by weight of black Rilsan Nylon 11 powder. The presence of the pigment did not appear to have a perceptible influence on the course of the reaction. The acid number of the product was 62.9.

The so-obtained resins were then tested in the above described way for electrodepositing coatings. In all cases the pH of the bath was 9.0.

| Resin | (a) | (b) | | (c) | | (d) | |
|---|---|---|---|---|---|---|---|
| Voltage (v.) | 80 | 80 | 120 | 80 | 120 | 80 | 120 |
| Current (ma.) | 265 | 90 | 85 | 94 | 99 | 70 | 90 |
| Film thickness (microns) | 16 | 9.5 | 10.5 | 8 | 8.5 | 8.5 | 11.5 |
| Film resistance (ohms/micron) | 18.6 | 92.1 | 132 | 105 | 141 | 133 | 114 |

EXAMPLE VI

A coating composition was prepared which gave a grey coat having a metallic appearance. To this end the ingredients mentioned hereinbelow were mixed in the sequence indicated.

|   | G. |
|---|---|
| Resin according to Example V(d) | 1024 |
| Diethylamine | 51 |
| Water | 766 |
| Aluminum paste (32% in ethoxyethanol) | 80 |
| TiO₂ paste | 48 |
| Violet concentrate | 16 |
| Blue concentrate | 8 |
| Water | 6100 |
|   | 8093 |

The 32% aluminum paste in ethoxyethanol was obtained by mixing equal weights of ethoxyethanol and of an aluminum paste containing 65% by weight of solids, and marketed as number 7290 by Aluminum Company of America.

The composition of the violet and blue concentrate in parts by weight was as follows:

|   | Violet | Blue |
|---|---|---|
| Resin of Example V(d) | 86 | 68.8 |
| Diethylamine | 4 | 3.2 |
| Water | 90 | 108 |
| Permanent Violet RL | 5 |   |
| Monolite Fast Blue |   | 4 |
|   | 185 | 184.0 |

The coating bath contained 10.15% by weight of solids; the ash content was 3.84% by weight.

This bath was tested also in the above described manner for coating panels of bonderized steel. The pH of the bath was 8.6. The maximum voltage at which a continuous film was obtained appeared to be more than 200 v. The applied films were subjected to a heat treatment at 160° C. during 25 minutes, and then showed exactly the desired color. Films were applied using voltages of 100, 130, 180 and 200 v. The film thicknesses were 12, 15, 16 and 17 microns, respectively.

The films of 16 microns were subjected to corrosion resistance tests, comprising a salt solution spray during 240 hours, and soaking in water for 500 hours. These films completely satisfied both tests.

The stability of the coating composition was also measured according to a pumping test, wherein the composition was circulated continuously. In this testing method the composition appeared to remain stable for 12–13 days.

The invention is defined in the claims which follow. We claim:

1. An aqueous dispersion comprising water having dispersed therein with the aid of a base a compatibilized acidic reaction product formed by heat reacting at a temperature in the range of 100–300° C.

(1) a polyhydric alcohol drying oil fatty acid ester adduct with from 3–25%, based on the weight of the adduct, of an ethylenically unsaturated polycarboxylic acid or anhydride, adduction involving the unsaturation of said acid or anhydride and the unsaturation of said ester, said polyhydric alcohol being a resinous polyhydric alcohol and said fatty acid being present in said ester in an amount to consume at least about 75% of the available hydroxy groups in said polyhydric alcohol; with (2) from 1–25%, based on the weight of the compatibilized product, of a linear polyamide resin containing terminal amino and carboxylic acid groups until a compatible organic solvent-soluble reaction product having sufficient acidity to enable dispersion in water with the aid of a base is formed.

2. A dispersion as recited in claim 1 in which said resinous polyhydric alcohol is an epoxy resin.

3. A dispersion as recited in claim 1 in which at least 5% of the available hydroxy groups in said polyhydric alcohol remain unreacted in said ester.

4. A dispersion as recited in claim 1 in which said polyamide is formed by the self-condensation of an amino acid having the formula

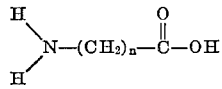

where $n$ is an integer of 5 or more.

5. A dispersion as recited in claim 4 in which $n$ is an integer up to 11.

6. A dispersion as recited in claim 1 in which said polyamide is formed by the self-condensation of 11-aminoundecanoic acid and is present in an amount of from 5–15%, based on the total weight of compatibilized product.

7. A dispersion as recited in claim 1 in which a diglycidyl ether of a bisphenol is substantially completely esterified by reaction with drying oil fatty acid and the ester so-produced is adducted with from 5–25% by weight of maleic anhydride, based on the weight of the adduct.

8. A dispersion as recited in claim 1 in which said polyamide is an autopolymerization product of ω-aminocarboxylic acid, and said ester is adducted with maleic anhydride.

9. A dispersion as recited in claim 1 in which the reaction between said adduct and said polyamide is carried out by cooking at a temperature of about 230° C.

10. An electrocoating bath comprising the dispersion of claim 1 having a pH in the range of about 6 to about 10.5 and a resin solids content of from 1–25% by weight.

11. An electrocoating bath as recited in claim 10 in which said base is a water soluble amine and said bath has a pH in the range of 7.5–9.5.

References Cited
UNITED STATES PATENTS

| 2,861,048 | 11/1958 | Wright et al. | 260—18 |
| 2,663,649 | 12/1953 | Winkler | 260—18 |
| 3,096,193 | 7/1963 | Tinker et al. | 260—18 |
| 2,970,204 | 1/1961 | Piceu | 260—18 |
| 3,251,790 | 5/1966 | Christenson et al. | 260—18 |
| 3,468,779 | 9/1969 | Slater et al. | 260—18 |
| 3,455,805 | 7/1969 | Smith et al. | 260—18 |
| 2,870,201 | 1/1959 | Pollack | 260—78 |
| 2,829,127 | 4/1958 | Munch et al. | 260—78 |

DONALD E. CZAJA, Primary Examiner

E. C. RZUCIDLO, Assistant Examiner

U.S. Cl. X.R.

204—181; 260—22 EP, 22 T, 23 EP, 29.2 EP, 830 P